United States Patent
Xu et al.

(10) Patent No.: US 9,253,818 B2
(45) Date of Patent: Feb. 2, 2016

(54) APPARATUS AND METHOD FOR MULTI-HOP RELAY COMMUNICATION IN BROADBAND WIRELESS COMMUNICATION SYSTEM

(75) Inventors: Mingxia Xu, Suwon-si (KR); Ji-Cheol Lee, Suwon-si (KR); Hyun-Jeong Kang, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 12/884,379

(22) Filed: Sep. 17, 2010

(65) Prior Publication Data
US 2011/0069654 A1 Mar. 24, 2011

(30) Foreign Application Priority Data
Sep. 24, 2009 (KR) .................. 10-2009-0090366

(51) Int. Cl.
*H04B 7/14* (2006.01)
*H04W 88/04* (2009.01)
*H04B 7/26* (2006.01)
*H04W 84/04* (2009.01)
*H04W 88/12* (2009.01)

(52) U.S. Cl.
CPC ............ *H04W 88/04* (2013.01); *H04B 7/2606* (2013.01); *H04W 84/047* (2013.01); *H04W 88/12* (2013.01)

(58) Field of Classification Search
None
See application file for complete search history.

(56) References Cited

U.S. PATENT DOCUMENTS

| | | | | |
|---|---|---|---|---|
| 7,715,389 | B2* | 5/2010 | Pichna et al. | 370/390 |
| 8,576,882 | B2* | 11/2013 | Zhang | H04L 12/4633 370/279 |
| 2002/0068588 | A1 | 6/2002 | Yoshida et al. | |
| 2004/0008649 | A1* | 1/2004 | Wybenga et al. | 370/338 |
| 2006/0245384 | A1 | 11/2006 | Talukdar et al. | |
| 2007/0072604 | A1* | 3/2007 | Wang | H04B 7/155 455/428 |
| 2007/0178880 | A1* | 8/2007 | Saito et al. | 455/405 |
| 2008/0089275 | A1* | 4/2008 | Hart et al. | 370/328 |
| 2008/0170535 | A1 | 7/2008 | Zheng | |
| 2008/0212513 | A1 | 9/2008 | Tao et al. | |

(Continued)

FOREIGN PATENT DOCUMENTS

| | | |
|---|---|---|
| JP | 2002-171572 A | 6/2002 |
| JP | 2008-099283 A | 4/2008 |

(Continued)

OTHER PUBLICATIONS

K. Eternad, "Overview of Mobile WiMAX Technology and Evolution," IEEE Communications Magazine, pp. 31-40, Oct. 2008.

(Continued)

*Primary Examiner* — Steve Young
(74) *Attorney, Agent, or Firm* — Jefferson IP Law, LLP

(57) ABSTRACT

An apparatus and operating method of a Relay Station (RS) and a Base Station (BS) controller for a multi-hop relay communication in a broadband wireless communication system is provided. The method of the RS includes, when receiving at least one traffic Media Access Control (MAC) Protocol Data Unit (PDU) from a Mobile Station (MS) accessing the RS, extracting a Layer-3(L3) packet from the at least one traffic MAC PDU, generating a relay MAC PDU including the L3 packet, and transmitting the MAC PDU to the BS through an RS Service Flow (SF) which supports Quality of Service (QoS) required by an MS SF carrying the L3 packet.

21 Claims, 8 Drawing Sheets

(56) References Cited

U.S. PATENT DOCUMENTS

| | | |
|---|---|---|
| 2008/0273878 A1* | 11/2008 | Wu et al. .......................... 398/67 |
| 2008/0285501 A1* | 11/2008 | Zhang et al. .................. 370/315 |
| 2008/0310338 A1 | 12/2008 | Charpenter et al. |
| 2009/0122734 A1* | 5/2009 | Kim et al. ..................... 370/310 |
| 2009/0190521 A1* | 7/2009 | Horn et al. .................... 370/315 |
| 2009/0190522 A1* | 7/2009 | Horn et al. .................... 370/315 |
| 2009/0213778 A1 | 8/2009 | Tao et al. |
| 2009/0225695 A1* | 9/2009 | Kang et al. ..................... 370/315 |
| 2009/0245166 A1* | 10/2009 | Okuda ............... H04L 12/4633 370/315 |
| 2010/0165911 A1* | 7/2010 | Chiu et al. .................... 370/315 |
| 2010/0309792 A1 | 12/2010 | Wang et al. |
| 2011/0080873 A1* | 4/2011 | Zhang et al. ................... 370/328 |
| 2011/0154144 A1 | 6/2011 | Nanda |
| 2011/0206027 A1 | 8/2011 | Hart et al. |

FOREIGN PATENT DOCUMENTS

| | | |
|---|---|---|
| JP | 2008-516529 A | 5/2008 |
| JP | 2008-187258 A | 8/2008 |
| JP | 2008-228280 A | 9/2008 |
| JP | 2008-541506 A | 11/2008 |
| JP | 2009-517935 A | 4/2009 |
| JP | 2010537456 A | 12/2010 |
| JP | 2011510543 A | 3/2011 |
| JP | 2011514041 A | 4/2011 |
| WO | 2006/106617 A1 | 10/2006 |
| WO | WO 2006106617 * | 10/2006 |

OTHER PUBLICATIONS

S. Ahmadi, "An Overview of Next-Generation Mobile WiMAX Technology," IEEE Communications Magazine, pp. 84-98, Jun. 2009.

A. Ksentini, "IPv6 over IEEE 802.16 (WiMAX) networks: Facts and challenges," Journal of Communications, vol. 3, No. 3, pp. 1-9, Jul. 2008.

* cited by examiner

APPARATUS AND METHOD FOR MULTI-HOP RELAY COMMUNICATION IN BROADBAND WIRELESS COMMUNICATION SYSTEM

PRIORITY

This application claims the benefit under 35 U.S.C. §119 (a) of a Korean patent application filed in the Korean Intellectual Property Office on Sep. 24, 2009 and assigned Serial No. 10-2009-0090366, the entire disclosure of which is hereby incorporated by reference.

BACKGROUND OF THE INVENTION

1. Field of the Invention

The present invention relates to a broadband wireless communication system. More particularly, the present invention relates to an apparatus and a method for multi-hop relay communication in a broadband wireless communication system.

2. Description of the Related Art

A fourth generation (4G) communication system, which is a next-generation communication system, has been introduced to provide users with services of various Quality of Service (QoS) levels at a data rate of about 100 Mbps. More particularly, 4G communication systems are advancing in order to support high speed services by guaranteeing mobility and QoS in Broadband Wireless Access (BWA) communication systems such as local area network systems and wireless metropolitan area network systems. Representative examples include an Institute of Electrical and Electronics Engineers (IEEE) 802.16 standard communication system. To support a broadband delivery network, the IEEE 802.16 standard communication system adopts Orthogonal Frequency Division Multiplexing (OFDM)/Orthogonal Frequency Division Multiple Access (OFDMA) scheme in a physical channel.

The IEEE 802.16 standard communication system ensures mobility of a Mobile Station (MS) and flexibility of the wireless network configuration, and to provide more efficient services in a radio environment under severe changes of traffic distribution or traffic requirement. One approach considers a communication system which adopts a multi-hop relay data delivery scheme using a Relay Station (RS). Using the RS in the broadband wireless communication system, coverage of a Base Station (BS) can be extended and its throughput can be enhanced. That is, by installing the RS in a particular area of poor channel environment, signals can be delivered. The MS traveling outside the coverage of the BS can communicate with the BS by installing the RS around the cell boundary.

To apply the multi-hop relay scheme as described above, the system needs to provide additional functions. For example, a scheduling method of the BS for controlling the RS, a scheduling scheme for guaranteeing the resource use of the RS, and a function for setting the access between the RS and the MS and the access between the RS and the BS are necessary. Therefore, it is impossible to utilize conventional equipment of the BS designed for a single-hop communication because there are difficulties in developing and deploying the multi-hop relay scheme.

Therefore, a need exists for an apparatus and method for utilizing a multi-hop scheme in a single-hop communication.

SUMMARY OF THE INVENTION

An aspect of the present invention is to address the above-mentioned problems and/or disadvantages and to provide at least the advantages described below. Accordingly, an aspect of the present invention to provide an apparatus and a method for adopting a multi-hop relay scheme with minimum burden on a system in a broadband wireless communication system.

Another aspect of the present invention is to provide an apparatus and a method for applying a Layer-3 (L3) relay scheme in a broadband wireless communication system.

Yet another aspect of the present invention is to provide an apparatus and a method for relay communication merely with little change to a base station in a broadband wireless communication system.

According to an aspect of the present invention, an operating method of a Relay Station (RS) in a broadband wireless communication system is provided. The method includes, when receiving at least one traffic Media Access Control (MAC) Protocol Data Unit (PDU) from a Mobile Station (MS) accessing the RS, extracting a Layer-3 (L3) packet from the at least one traffic MAC PDU, generating a relay MAC PDU including the L3 packet, and transmitting the MAC PDU to a Base Station (BS) through an RS Service Flow (SF) which supports Quality of Service (QoS) required by an MS SF carrying the L3 packet.

According to another aspect of the present invention, an operating method of a BS controller in a broadband wireless communication system is provided. The method includes, when receiving a Generic Routing Encapsulation (GRE) packet including an L3 packet of an MS accessing an RS from the BS, extracting at least one L3 packet of at least one MS from the GRE packet, and transmitting the at least one L3 packet to a destination of the at least one L3 packet.

According to yet another aspect of the present invention, an apparatus of an RS in a broadband wireless communication system is provided. The apparatus includes a traffic processor for, when at least one traffic MAC PDU is received from an MS accessing the RS, extracting an L3 packet from the at least one traffic MAC PDU and for generating a relay MAC PDU including the L3 packet, and a transmitter for transmitting the MAC PDU to a BS through an RS SF which supports QoS required by an MS SF carrying the L3 packet.

According to still another aspect of the present invention, an apparatus of a BS controller in a broadband wireless communication system is provided. The apparatus includes a traffic processor for, when a GRE packet including an uplink L3 packet of an MS accessing an RS is received from the BS, extracting at least one L3 packet of at least one MS from the GRE packet, and a communicator for transmitting the at least one L3 packet to a destination of the at least one L3 packet.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

Detailed Description of Exemplary Embodiments

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a Layer-3 (L3) relay communication scheme, that is, a relay communication scheme of an Internet Protocol (IP) layer, to reduce burden on a system when a multi-hop relay scheme is applied. Hereinafter, an Orthogonal Frequency Division Multiplexing (OFDM)/Orthogonal Frequency Division Multiple Access (OFDMA) wireless communication system is exemplified, and the present invention is applicable to other wireless communication systems.

Figure 1:
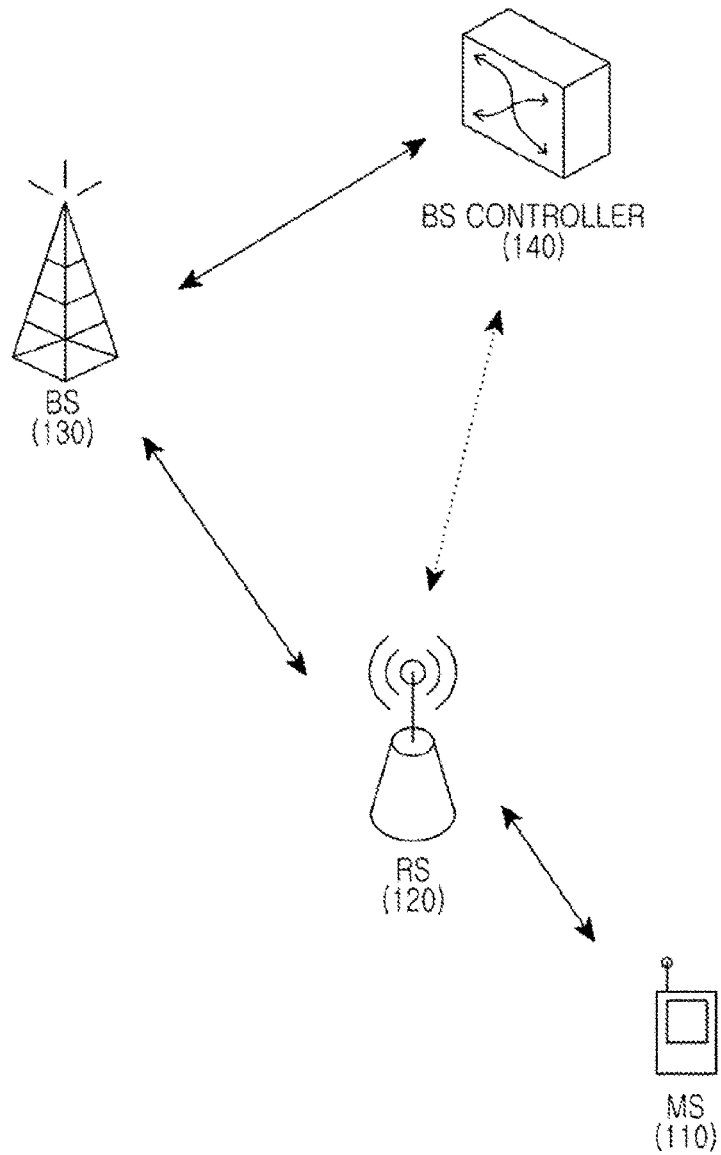
FIG. 1 is a diagram of a broadband wireless communication system according to an exemplary embodiment of the present invention.

A construction of the wireless communication system for the L3 relay communication is illustrated in FIG. 1.

FIG. 1 is a diagram of a broadband wireless communication system according to an exemplary embodiment of the present invention.

Referring to FIG. 1, the system for the L3 relay communication includes a Mobile Station (MS) 110, a Relay Station (RS) 120, a Base Station (BS) 130, and a BS controller 140. The MS 110, which is a user equipment, accesses the RS 120 or the BS 130 over a radio channel. The RS 120, which is an entity for a multi-hop communication, operates as the MS 110 in view of the BS 130 and as the BS 130 in view of the MS 110. The BS 130, which is an entity for supporting mobility and wireless communication of the MS 110, controls access of the MS 110 and allocates a radio resource to the MS 110. The BS controller 140, which is an entity for serving as a gateway for a connection to a backbone network and for controlling the BS 130, is also called an Access Service Network (ASN)-GateWay (GW).

In the L3 relay communication, the BS 130 recognizes the RS 120 as an MS. The BS controller 140 recognizes the RS 120. The MS 110 accessing the RS 120 recognizes the RS 130 as a BS. Hence, without changing the system, it is possible to support the L3 relay communication according to the status of the RS 130 as described above.

Accordingly, the multi-hop is set in three steps.

In the first step, the RS 120 accesses the BS 130 as an MS. The RS 120 is of the same status as the MS 110. The RS 120 performs a network entry procedure to the BS 130 and establishes the connection. The network entry procedure is carried out the same as the network entry procedure between the BS 130 and the MS 110.

In the second step, the RS 120 registers to the BS controller 140 as an RS. After the first step, Internet Protocol (IP) connection is set between the RS 120 and the BS controller 140. Through the second step, the BS controller 140 recognizes the RS 120. Accordingly, RS_Register_Req/Rsp messages are used for signaling. The RS_Register_Req/Rsp messages include a Station IDentifier (ID) of the RS 120.

In the third step, the MS 110 accesses the RS 120 as if accessing the BS 130. In view of the MS 130, the third step is similar to the access procedure of the MS 110 to the BS 130. That is, the RS 120 functions as the BS 130. Yet, signals between the RS 120 and the backbone network are forwarded by the BS 130.

After setting the multiple hops as described above, the signaling and the data forwarding are carried out as described below.

Figure 2:
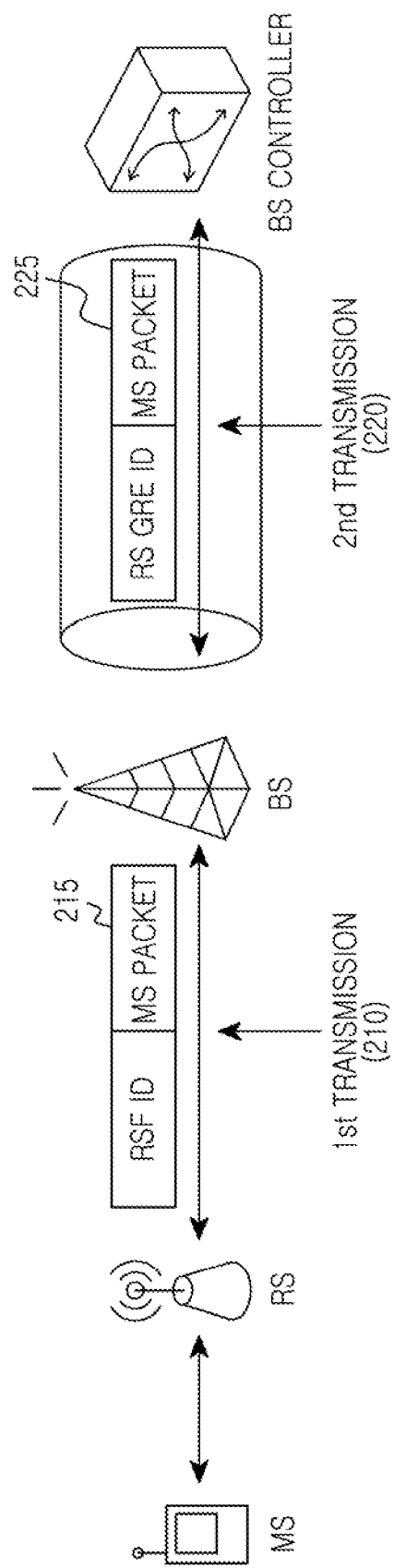
FIG. 2 is a diagram of data forwarding in a broadband wireless communication system according to an exemplary embodiment of the present invention.

In the L3 relay communication, the RS functions as the BS to allow MSs to access the RS. The RS generates Generic Routing Encapsulation (GRE) packets for the service flow of the accessed MS, and the GRE packets are forwarded from the RS to the BS controller by the BS. Hence, the RS sets a GRE tunnel to deliver data of the accessed MS, and a GRE tunnel to deliver data of the RS. FIG. 2 provides a scheme for efficiency of the data forwarding.

FIG. 2 is a diagram of data forwarding in a broadband wireless communication system according to an exemplary embodiment of the present invention.

Referring to FIG. 2, the data forwarding include two transmissions. The first transmission 210 is conducted in a relay link between an RS and a BS. In an uplink communication, the RS transmits L3 packets of a MS having a similar Quality of Service (QoS) level, as one Media Access Control (MAC) Protocol Data Unit (PDU) 215 of the RS. In a downlink communication, the RS receives one RS MAC PDU 215 from the BS, and forwards encapsulated L3 packets of the MS to MSs. In the relay link, GRE tunnels are not used.

The second transmission 220 is conducted in a link between the BS and a BS controller. The second transmission 220 uses the GRE tunnel 230 and generates one GRE tunnel per RS. In the uplink communication, the BS processes the RS MAC PDU from the RS like a general MS MAC PDU, and generates a GRE packet 225 by inserting a GRE header for the uplink transmission. In the downlink communication, the BS processes the GRE packet 225 from the BS controller like a general MS MAC PDU, removes the GRE header, and generates a MAC PDU. When receiving the GRE packet 225 identified with a GRE ID of the RS, the BS controller removes the GRE header, separates the L3 packets of the MS from the payload, and forwards the packet over a network. The BS controller may generate and transmit a GRE packet for the RS including the L3 packets of the multiple MSs, according to mapping information. By omitting the GRE tunnel for access of the MS to the RS as required in the L2 relay communication, the data forwarding overhead is reduced.

Figure 3:
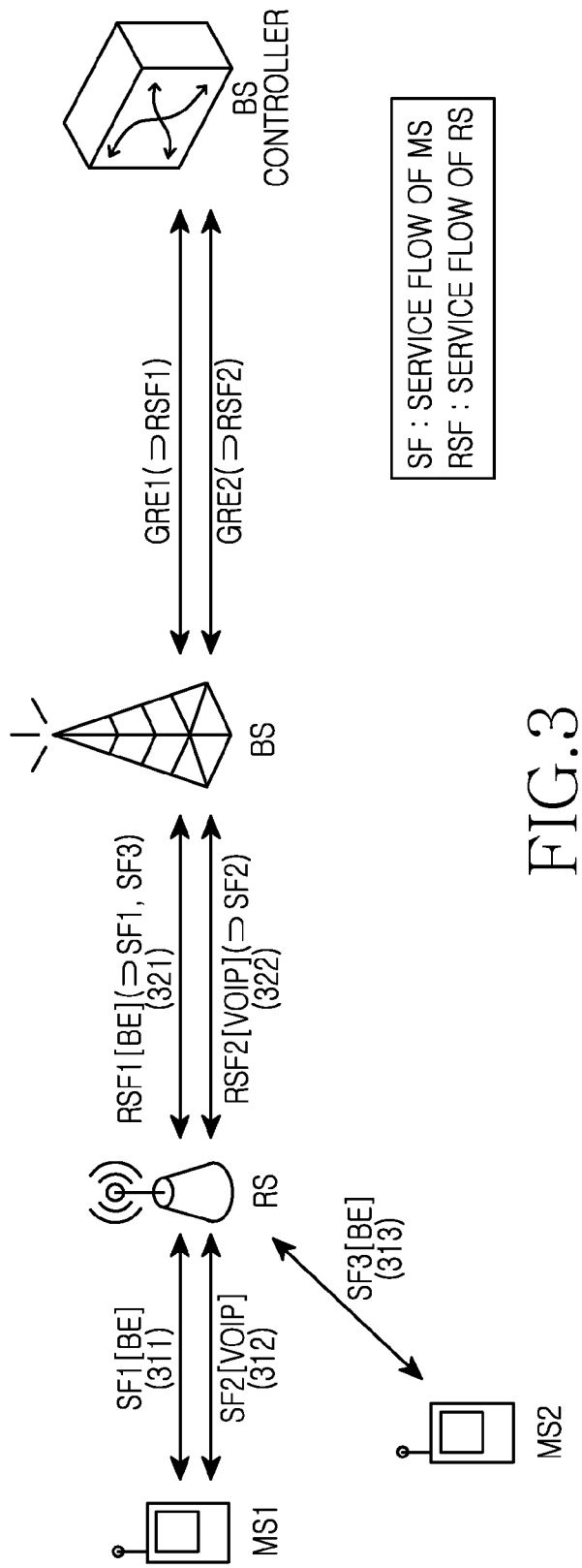
FIG. 3 is a diagram of service flows between links in a broadband wireless communication system according to an exemplary embodiment of the present invention.

In view of the service flow, the data forwarding is carried out as illustrated in FIG. 3.

FIG. 3 depicts service flows between links in a broadband wireless communication system according to an exemplary embodiment of the present invention.

Referring to FIG. 3, An MS1 includes an SF1 311 requiring a QoS of Best Effort (BE) and an SF2 312 requiring a QoS of Voice over Internet Protocol (VoIP). An MS2 includes an SF3 313 requiring the QoS of the BE. Accordingly, a RS for forwarding data through Service Flows (SFs) of the MS1 and the MS2 includes an Relay Station Service Flow (RSF)1 321 requiring the QoS of the BE and an RSF2 322 requiring the QoS of the VoIP. L3 packets of the MS from different MSs requiring a similar QoS level may be transmitted through one RS SF similar to a tunnel operation. Hence, in FIG. 3, the RSF1 321 is used to forward data of the SF1 311 and the SF3 313, and the RSF2 322 is used to forward the data of the SF2 312. The relay MAC PDU transmitted through the RSF1 321 and the RSF2 322 includes MAC PDUs of the MS and a signaling of a L2 higher layer.

In an uplink communication, the RS encapsulates the L3 packets of the MS corresponding to the MAC PDU of the RS for the uplink communication. In FIG. 3, the RS encapsulates the L3 packet of the MS1 received through the SF1 311 and the L3 packet of the MS2 received through the SF3 313 into the MAC PDU of the RSF1 321, and transmits the MAC PDU to the BS through the RSF1 321. Since the data received via the SF1 311 is in the form of the MAC PDU, the RS extracts the L3 packets by removing a MAC header.

In the downlink communication, the RS separates the decapsulated packets destined for the MSs, from the MAC PDU received from the BS, and transmits the packets to the respective MSs. That is, the packets are classified by the RS. In FIG. 3, when receiving the MAC PDU from the BS over the RSF1 321, the RS splits the payload of the MAC PDU to the L3 packet of the SF1 311 and the L3 packet of the SF3 313, and transmits the L3 packets to the MS1 and the MS2 through the SF1 311 and the SF3 313.

The signaling between the MS and the BS controller is accomplished using a relation of the SFs as illustrated in FIG. 3. Notably, for the RS to forward a signaling message to the BS controller, an RS SF is set only for the signaling. Herein, the message may be the RS_Register_Req/Rsp message or other L3 message to register the RS. That is, the SF for the signaling is used to deliver not only the signaling message of the MS but also the signaling message of the RS.

Figure 4:
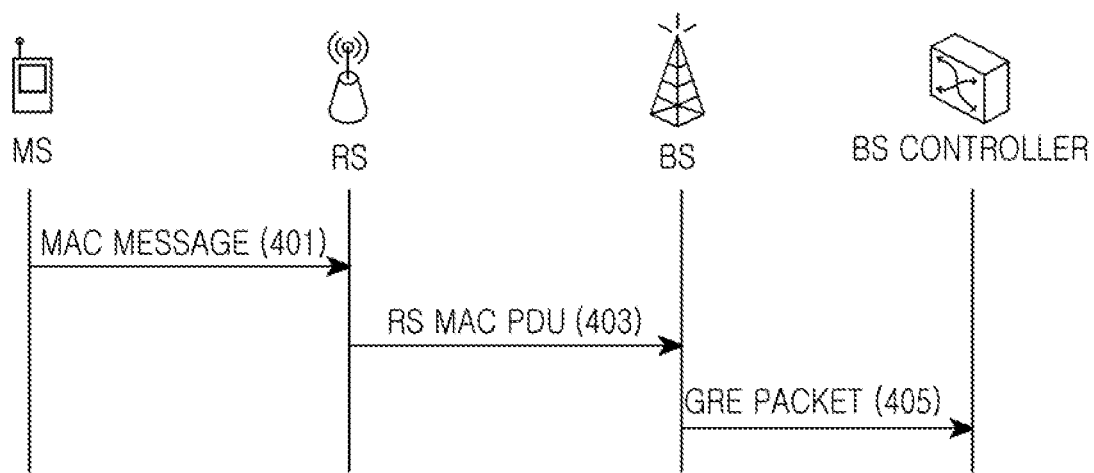
FIG. 4 is a diagram of signal exchanges for forwarding a signaling message in a broadband wireless communication system according to an exemplary embodiment of the present invention.

For example, in the uplink signaling, signals are transmitted and received between entities as illustrated in FIG. 4. The MS transmits the MAC message to the RS in step 401. The RS generates the relay MAC PDU including the MAC message and transmits the relay MAC PDU to the BS through the SF for the signaling in step 403. The BS includes the relay MAC PDU to the GRE packet as in the traffic processing and transmits the GRE packet to the BS controller in step 405. The BS controller obtains the relay MAC PDU from the GRE packet and recognizes that the relay MAC PDU contains the MAC message by confirming the SF of the relay MAC PDU. Thus, the BS controller performs the operation corresponding to the MAC message.

Operations and structures of the RS and the BS controller for the multi-hop relay communication are described above.

Figure 5:
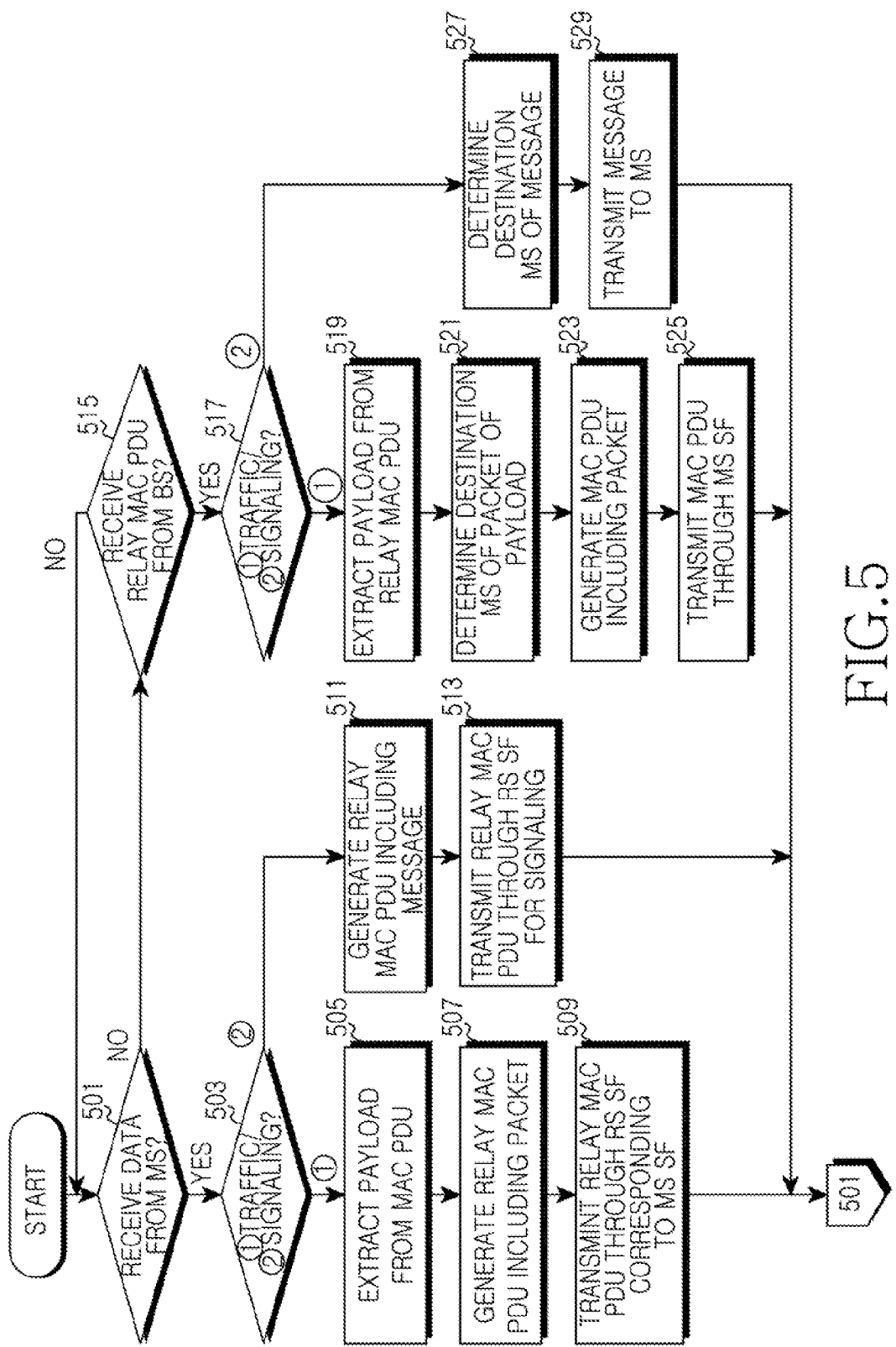
FIG. 5 is a flowchart of operations of a relay station in a broadband wireless communication system according to an exemplary embodiment of the present invention.

FIG. 5 is a flowchart of operations of an RS in a broadband wireless communication system according to an exemplary embodiment of the present invention.

Referring to FIG. 5, in step 501, the RS determines whether uplink data is received from an MS accessing to the RS. Herein, the uplink data includes data received from one MS or a plurality of MSs.

Upon receiving the uplink data, the RS determines whether the uplink data is traffic or a signaling message in step 503. For example, the RS determines whether the uplink data is the traffic or the signaling message, based on a MAC header.

When the uplink data is the traffic, the RS removes the MAC header from a MAC PDU generating the uplink data and extracts a payload in step 505. Thus, the RS obtains an L3 packet of the MS. When the L3 packet is fragmented and carried by the plurality of the MAC PDUs, the RS obtains the L3 packet by receiving the MAC PDUs. When the uplink data is a set of the MAC PDUs received from the multiple MSs, the RS extracts a plurality of L3 packets from the MAC PDUs of the MSs.

In step 507, the RS generates a relay MAC PDU including the L3 packet. When the plurality of L3 packets is extracted, the RS includes the L3 packets received through the SF requiring the same QoS, into one relay MAC PDU. Hence, when receiving the L3 packets via the SF requiring the different QoS levels, the RS generates a plurality of MAC PDUs.

After generating the MAC PDU, the RS transmits the relay MAC PDU through the RS SF corresponding to the MS SF carrying the uplink data in step 509. In more detail, the RS transmits the relay MAC PDU through the RS SF supporting the same QoS as the QoS required by the MS SF carrying the uplink data. When the plurality of relay MAC PDUs is generated, the RS transmits the MAC PDUs through the different RS SFs supporting the different QoS levels.

When the uplink data is the signaling message in step 503, the RS generates the relay MAC PDU including the message in step 511. That is, the message is carried by the relay MAC PDU similarly to traffic forwarding.

After generating the relay MAC PDU, the RS transmits the relay MAC PDU through the RS SF for the signaling in step 513. Besides the SFs for the traffic forwarding, the RS SF for the signaling forwarding separately exists.

If the uplink data is not received from the MS in step 501, the RS determines whether the relay MAC PDU is received from the BS in step 515. Receiving no relay MAC PDU, the RS returns to step 501.

Upon receiving the relay MAC PDU, the RS determines whether the relay MAC PDU is the traffic or the signaling message in step 517. Herein, whether the relay MAC PDU is the traffic or the signaling message is determined based on which relay SF carries the relay MAC PDU.

If it is determined that the relay MAC PDU is the traffic, the RS extracts the payload from the relay MAC PDU in step 519. The payload includes L3 packets of one MS or multiple MSs.

After extracting the payload, the RS determines a destination MS of the packet in step 521. When the payload includes the L3 packets, the RS determines the destination MS of each L3 packet and then classifies the packets. For example, the destination MS is identified with an IP header of the L3 packet.

In step 523, the RS generates the MAC PDU including the packet. As for the plurality of L3 packets, the RS generates MAC PDUs, as many as the MS SFs, to deliver the packets. That is, for the plurality of L3 packets, the RS divides the payload of the relay MAC PDU into the L3 packets and generates the MAC PDUs for the respective MS SFs corresponding to the L3 packets.

In step 525, the RS transmits the MAC PDU through the MS SF. When the MAC PDUs are generated, the RS transmits the MAC PDUs to their destination MSs through corresponding SFs, respectively.

If it is determined that the relay MAC PDU is the signaling message in step 517, the RS determines the destination MS of the message in step 527. The RS transmits the message to the destination MS in step 529. Although not illustrated in FIG. 5, the destination of the message may be the RS. In this case, the RS directly processes the message, without forwarding the message.

Figure 6:
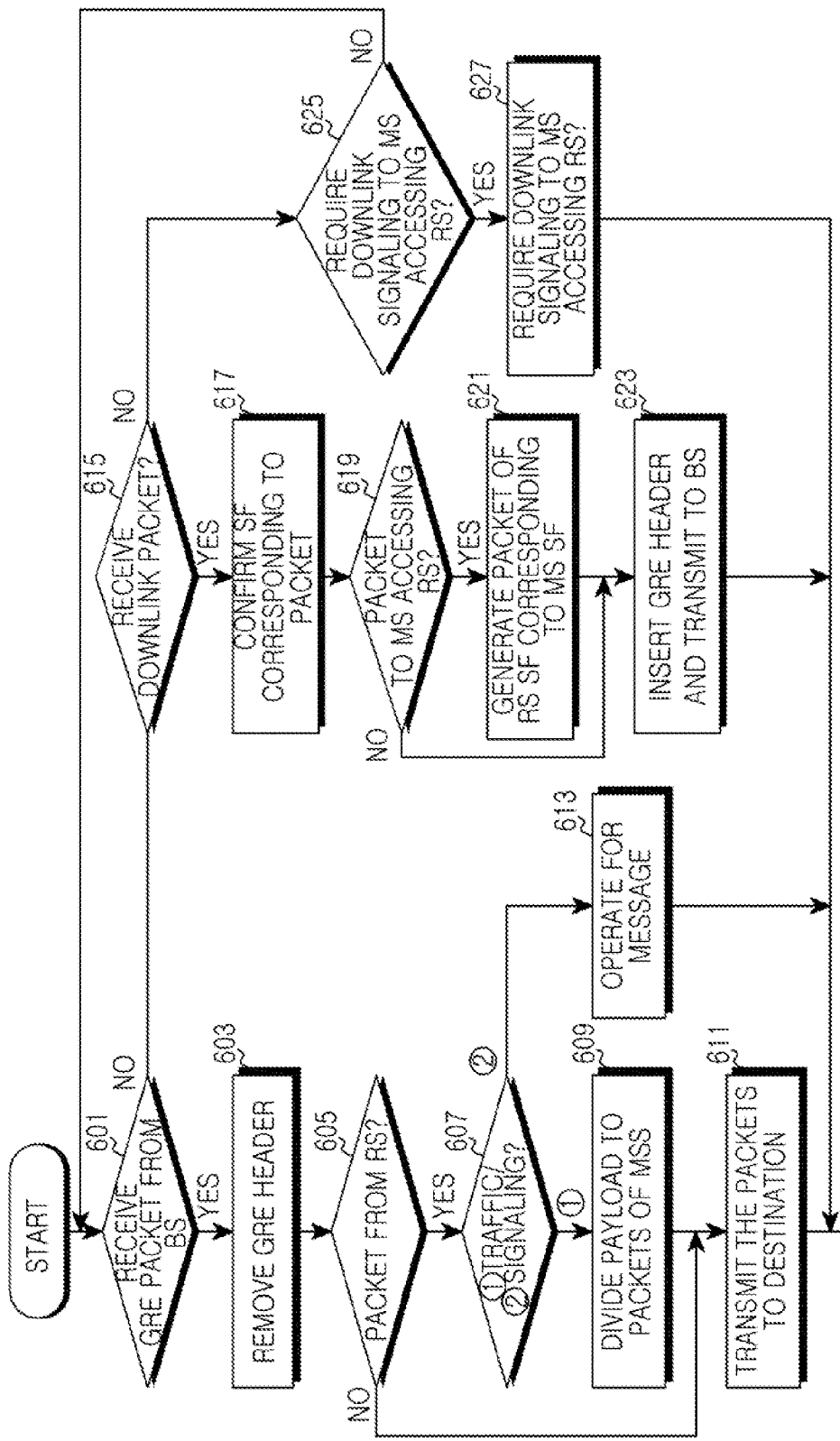
FIG. 6 is a flowchart of operations of a base station controller in a broadband wireless communication system according to an exemplary embodiment of the present invention.

FIG. 6 is a flowchart of operations of a BS controller in a broadband wireless communication system according to an exemplary embodiment of the present invention.

In step 601, the BS controller determines whether a GRE packet is received from the BS. Herein, the GRE packet includes a GRE ID and a payload.

Upon receiving the GRE packet, the BS controller removes a GRE header in step 603. That is, the BS controller extracts the payload of the GRE packet.

In step 605, the BS controller determines whether the GRE packet is the packet from the RS. For example, the GRE packet is determined as the packet from the RS based on the GRE header. Using the GRE ID in the GRE header, the BS controller identifies the GRE packet from the RS. When the GRE packet is not the packet from the RS, the BS controller proceeds to step 611.

If it is determined that the GRE packet is the packet from the RS, the BS controller determines whether the GRE packet is traffic or a signaling message in step 607. For example, the BS controller may determine whether the GRE packet is the signaling message, based on the type of the RS SF carrying the payload of the GRE packet in the link of the BS and the RS. That is, when receiving the GRE packet including uplink data carried through the RS SF for signaling forwarding, the BS controller recognizes the uplink data as the signaling message.

If it is determined that the packet is the traffic, the BS controller divides the payload of the GRE packet to the L3 packets of the MSs in step 609. The payload of the GRE packet includes at least one L3 packet of the MS. Accordingly, as for the L3 packets of the MSs, the BS controller classifies the L3 packets based on a source MS to process the L3 packets.

In step 611, the BS controller transmits the L3 packets to their destinations respectively. Herein, the destination may be another MS or a particular server. Accordingly, the BS controller transmits the L3 packets, to another BS, another BS controller or an IP network to deliver the L3 packets to their destinations.

If it is determined that the GRE packet is the signaling message in step 607, the BS controller performs an operation corresponding to the message in step 613. For example, when receiving the message for generating/modifying/deleting the SF, the BS controller functions to generate/modify/delete the corresponding SF. Alternatively, when receiving the message requesting to register the RS, the BS controller registers the corresponding RS.

If the GRE packet is not received from the BS in step 601, the BS controller determines whether a downlink packet is received in step 615. The downlink packet may be received from a lower BS, the other BS controller, or the IP network. Herein, the packet indicates the L3 packet.

Upon receiving the downlink packet, the BS controller confirms an MS SF corresponding to the downlink packet in step 617. That is, the BS controller identifies a destination MS of the downlink packet and determines which one of the SFs of the destination MS delivers the downlink packet. For example, the destination MS is identified with the IP header of the packet.

In step 619, the BS controller determines whether the downlink packet is the packet destined for the MS accessing the RS. That is, the BS controller determines whether the destination MS is the MS accessing the RS.

When the downlink packet is the packet destined for the MS accessing the RS, the BS controller generates a packet of a RS SF corresponding to the MS SF to carry the L3 packet in step 621. The MS SF corresponds to the RS SF, and the plurality of MS SFs may correspond to one RS SF. Hence, upon receiving the plurality of L3 packets, the BS controller confirms the RS SFs corresponding to the respective MS SFs to carry the L3 packets, and includes the L3 packets corresponding to the same RS SF to one GRE payload.

In step 623, the BS controller generates the GRE packet by inserting the GRE header into the packet and transmits the GRE packet to the BS through the GRE tunnel in step 623.

If the downlink packet is not received in step 615, the BS controller determines whether the downlink signaling to the MS accessing the RS is required in step 625. For example, by receiving a particular request message from the MS, the BS controller determines whether to transmit a response message for the request message.

When requiring the downlink signaling to the MS accessing the RS, the BS controller generates a packet of the RS SF for the signaling in step 627. The MS SF corresponds to the RS SF, and the plurality of MS SFs may correspond to one RS SF. At this time, the RS SF only for the signaling exists.

In step 623, the BS controller generates a GRE packet by inserting the GRE header and transmits the GRE packet to the BS.

Figure 7:
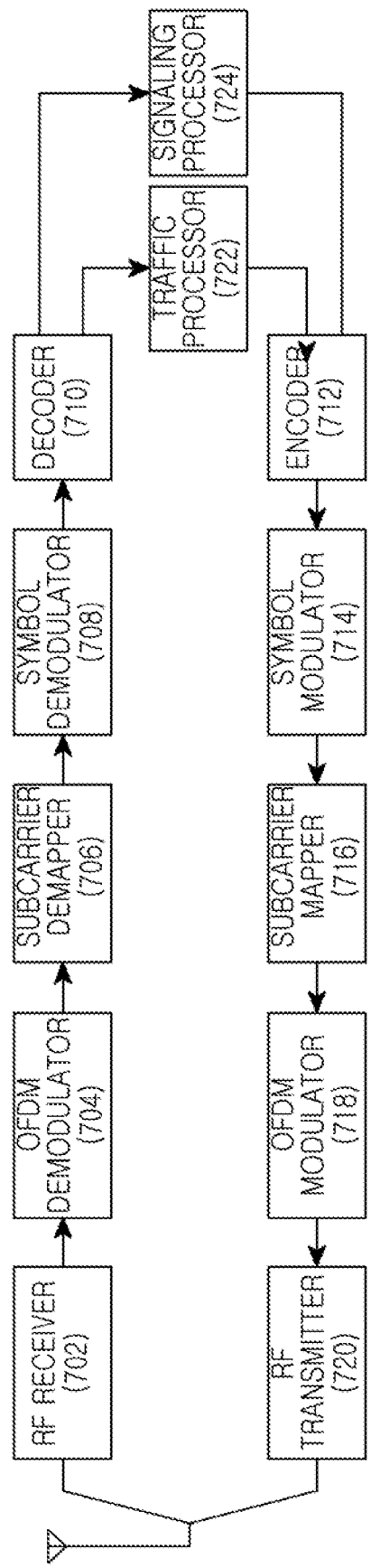
FIG. 7 is a block diagram of a relay station in a broadband wireless communication system according to an exemplary embodiment of the present invention.

FIG. 7 is a block diagram of a RS in a broadband wireless communication system according to an exemplary embodiment of the present invention.

The RS of FIG. 7 includes a Radio Frequency (RF) receiver 702, an OFDM demodulator 704, a subcarrier demapper 706, a symbol demodulator 708, a decoder 710, an encoder 712, a symbol modulator 714, a subcarrier mapper 716, an OFDM modulator 718, an RF transmitter 720, a traffic processor 722, and a signaling processor 724.

The RF receiver 702 down-coverts a downlink signal received over an antenna to a baseband signal. The OFDM demodulator 704 divides the signal output from the RF receiver 702 into OFDM symbols and restores complex symbols mapped to the frequency domain using Fast Fourier Transform (FFT) process. The subcarrier demapper 706 classifies complex symbols mapped to the frequency domain on the processing unit basis. The symbol demodulator 708 demodulates the complex symbols to a bit stream. The decoder 710 restores an information bit stream by channel-decoding the bit stream.

The encoder 712 channel-encodes a transmit bit stream. The symbol modulator 714 modulates the channel-encoded bit stream to complex symbols. The subcarrier mapper 716 maps the complex symbols into a frequency domain. The OFDM modulator 718 converts the complex symbols mapped to the frequency domain to a time-domain signal using an Inverse FFT (IFFT) process, and generates OFDM symbols by attaching a Cyclic Prefix (CP). The RF transmitter 720 up-converts the baseband signal to a downlink signal and transmits the downlink signal over an antenna.

The traffic processor 722 functions to relay the traffic. More specifically, the traffic processor 722 temporarily stores uplink traffic received from the MS and controls to transmit the uplink traffic to the BS. The traffic processor 722 temporarily stores downlink traffic received from the BS and controls to transmit the downlink traffic to the MS. Operations of the traffic processor 722 are described in more detail below.

When the uplink traffic is received from the MS, the traffic processor 722 removes a MAC header from a MAC PDU generating the uplink data and extracts a payload. Herein, the payload indicates the L3 packet. When the uplink data includes the data received from the plurality of the MSs, the RS extracts the multiple packets from the MAC PDUs of the MSs. The traffic processor 722 generates the relay MAC PDU including the packet. Accordingly, when the multiple packets are extracted, the RS includes the packets received via the SF requiring the same QoS level, into one relay MAC PDU. When the packets are received via the SFs requiring the different QoS levels, the traffic processor 722 generates a plurality of relay MAC PDUs. Next, the traffic processor 722 transmits the relay MAC PDU through the RS SF corresponding to the MS SF carrying the uplink data. When the plurality of relay MAC PDUs is generated, the traffic processor 722 transmits the MAC PDUs through the different RS SFs supporting the different QoS levels.

When the downlink traffic, that is, the relay MAC PDU, is received from the BS, the traffic processor 722 extracts the payload from the relay MAC PDU. The payload includes the packet of one MS or the packets of multiple MSs. The traffic processor 722 identifies a destination MS of the packet. When the payload includes the multiple packets, the traffic processor 722 classifies the packets by verifying the destination MS of each packet. Next, the traffic processor 722 generates the MAC PDU including the packet. As for the multiple packets, the traffic processor 722 generates the MAC PDUs as many as the MS SFs to carry the packets. The traffic processor 722 transmits the MAC PDU through an MS SF. As for the plurality of the MAC PDUs, the traffic processor 722 transmits the MAC PDUs to the respective destination MSs through corresponding SFs.

The signaling processor 724 functions to relay the signaling message. The signaling processor 724 temporarily stores an uplink message received from the MS and controls to transmit the uplink message to the BS. The signaling processor 724 temporarily stores the downlink message received from the BS and controls to transmit the downlink message to the MS. The operations of the signaling processor 724 are described in more detail below.

When the uplink message is received from the MS, the signaling processor 724 generates the relay MAC PDU including the message. The message is carried by the relay MAC PDU similarly to the traffic forwarding. After generating the relay MAC PDU, the signaling processor 724 transmits the relay MAC PDU through the RS SF for the signaling. That is, in addition to the SFs for forwarding the traffic, the RS SF exists for forwarding the signaling.

When the relay MAC PDU including the downlink message is received from the BS, the signaling processor 724 identifies the destination MS of the message and transmits the message to the destination MS. Herein, whether the message is the traffic or the signaling message is determined by the relay SF which delivers the relay MAC PDU.

Figure 8:
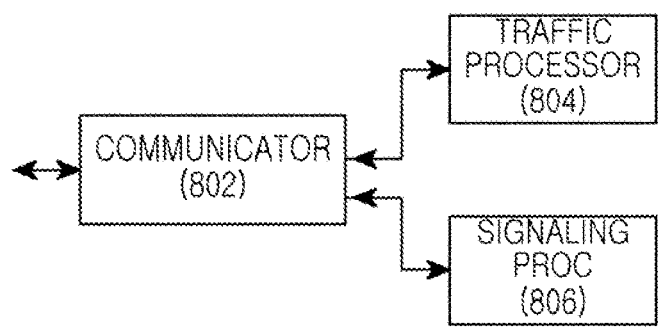
FIG. 8 is a block diagram of a base station controller in a broadband wireless communication system according to an exemplary embodiment of the present invention.

FIG. 8 is a block diagram of a BS controller in a broadband wireless communication system according to an exemplary embodiment of the present invention.

Referring to FIG. 8, the BS controller includes a communicator 802, a traffic processor 804, and a signaling processor 806.

The communicator 802 provides an interface for a wired communication with other network entities. That is, the communicator 802 converts data to transmit to a physical signal and converts the received physical signal to data.

The traffic processor 804 functions to process the traffic transmitted from an MS or the traffic to transmit to the MS. The packet of the MS accessing a RS is transmitted or received by means of a GRE packet. The processing of the packet of the MS accessing the RS is described in detail below.

When the GRE packet is received from the BS, the traffic processor 804 extracts a payload of the GRE packet by removing a GRE header in the GRE packet. The traffic processor 804 determines whether the GRE packet originates from the RS. When the GRE packet originates from the RS, the traffic processor 804 determines whether the packet is traffic. If it is determined that the GRE packet is traffic, the traffic processor 804 divides the payload of the GRE packet into the packets of the MSs. In other words, the payload of the GRE packet includes at least one MS packet. When the payload includes the packets of the multiple MSs, the traffic processor 804 classifies the packets based on the source MS to process the packets. The traffic processor 804 transmits the packets to their destinations respectively via the communicator 802. Herein, the destination is another MS or a particular server. Hence, the traffic processor 804 transmits the packets to another BS, another BS controller, or an IP network to forward the packets to the destinations.

When a downlink packet is received, the traffic processor 804 confirms an MS SF corresponding to the downlink packet. In more detail, the BS controller identifies a destination MS of the downlink packet, and determines which one of the SFs of the destination MS will deliver the downlink packet. The traffic processor 804 examines whether the downlink packet is the packet destined for the MS accessing the RS. When the downlink packet is the packet destined for the MS accessing the RS, the traffic processor 804 generates the packet of the RS SF corresponding to the MS SF to deliver the packet. Namely, the MS SF corresponds to the RS SF, and the plurality of the MS SFs may correspond to one RS SF. After generating the packet of the RS SF, the traffic processor 804 generates the GRE packet by inserting the GRE header to the packet, and transmits the GRE packet to the BS through the GRE tunnel.

The signaling processor 806 functions to process the message transmitted from the MS or the message to transmit to the MS. The packet of the MS accessing the RS is transmitted or received by means of the GRE packet. The processing on the packet of the MS accessing the RS is elucidated.

When the GRE packet including the signaling message is received from the BS, the signaling processor 806 performs an operation corresponding to the message. For instance, when the message for generating/modifying/deleting the SF is received, the signaling processor 806 operates to generate/modify/delete a corresponding SF.

When the downlink signaling to the MS accessing the RS is necessary, the signaling processor 806 generates the packet of the RS SF for the signaling including the message. For example, by receiving the request message from the MS, the signaling processor 806 determines whether to transmit a response message for the request message. The signaling processor 806 generates the GRE packet by inserting the GRE header, and transmits the GRE packet to the BS via the communicator 802.

By applying an L3 relay scheme in a broadband wireless communication system, the BS does not have to be included in the access of the MS to the RS. Thus, the BS designed for a single-hop communication may be used for multi-hop communication.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a Relay Station (RS) supporting a Layer-3 (L3) relay communication in a wireless communication system, the method comprising:
    establishing a first connection with a Base Station (BS) by performing a network entry procedure as a Mobile Station (MS);
    establishing a second connection with a MS by performing a network entry procedure as a BS;
    receiving at least one Media Access Control (MAC) Protocol Data Unit (PDU) including traffic from the MS through the second connection;
    generating an L3 packet, which is fragmented into the at least one MAC PDU, from the at least one MAC PDU, wherein the L3 packet comprises an Internet Protocol (IP) packet;
    generating at least one relay MAC PDU including the L3 packet generated from the at least one MAC PDU, without at least one header of the at least one MAC PDU; and
    transmitting the at least one relay MAC PDU including the L3 packet using a RS Service Flow (SF) for a traffic, of a same Quality of Service (QoS) as QoS required by MS SFs carrying the L3 packet from the MS to the RS to the BS through the first connection.

2. The method of claim 1, further comprising:
    receiving at least one MAC PDU including a signaling message from the MS through the second connection;
    generating a relay MAC PDU including the signaling message; and
    transmitting the relay MAC PDU including the signaling message to the BS using a RS SF dedicated to a signaling through the first connection.

3. The method of claim 1, further comprising:
    receiving at least one downlink relay MAC PDU from the BS through the first connection;
    generating an L3 packet, which is fragmented into the at least one downlink relay MAC PDU, from the at least one relay MAC PDU, wherein the L3 packet comprises an IP packet;
    generating at least one downlink MAC PDU including the L3 packet; and
    transmitting the at least one MAC PDU to the MS through the second connection.

4. The method of claim 3, wherein the generating of the at least one downlink MAC PDU comprises,
    dividing a payload of the at least one downlink relay MAC PDU into a plurality of L3 packets; and
    generating a plurality of downlink MAC PDUs for MS SFs corresponding to the L3 packets.

5. An operating method of a gateway supporting a Layer-3 (L3) relay communication in a wireless communication system, the method comprising:
    establishing, at a Base Station (BS) controller, an L3 connection with a Relay Station (RS);
    receiving, from a BS, at least one Generic Routing Encapsulation (GRE) packet including traffic;
    determining that the at least one GRE packet is transmitted from the RS based on a header of the at least one GRE packet;
    determining that the at least one GRE packet includes the traffic, if an RS Service Flow (SF) carrying a payload of the at least one GRE packet is dedicated to traffic;
    extracting an L3 packet of at least one Mobile Station (MS) from the at least one GRE packet, wherein the L3 packet comprises an Internet Protocol (IP) packet; and
    transmitting the L3 packet to a destination of the L3 packet.

6. The method of claim 5, further comprising:
    receiving, from the BS, at least one GRE packet including a signaling message;
    determining that the at least one GRE packet is transmitted from the RS based on a header of the at least one GRE packet;
    determining that the at least one GRE packet includes the signaling message, if an RS SF carrying a payload of the at least one GRE packet is dedicated to signaling; and
    performing an operation corresponding to the signaling message.

7. The method of claim 5, further comprising:
    receiving an L3 packet destined for the at least one MS accessing the RS;
    generating at least one packet for a RS SF including the L3 packet;
    generating at least one GRE packet including the at least one packet for a RS SF; and
    transmitting the at least one GRE packet to the BS.

8. The method of claim 5, further comprising:
    receiving a plurality of L3 packets;
    identifying RS SFs corresponding to MS SFs to carry the plurality of the L3 packets;
    generating a single GRE packet including the plurality of the L3 packets corresponding to the same RS SF; and
    transmitting the single GRE packet to the BS.

9. The method of claim 5, further comprising:
    if downlink signaling to the at least one MS accessing the RS is needed, generating a packet for a RS SF dedicated to signaling forwarding; and
    transmitting a GRE packet including the packet for the RS SF to the BS.

10. An apparatus of a Relay Station (RS) supporting a Layer-3(L3) relay communication in a wireless communication system, the apparatus comprising:
    a processor configured to:
        establish a first connection with a Base Station (BS) by performing a network entry procedure as a Mobile Station (MS), and
        establish a second connection with a MS by performing a network entry procedure as a BS; and
    a transceiver configured to receive at least one Media Access Control (MAC) Protocol Data Unit (PDU) including traffic from the MS through the second connection, wherein the processor is further configured to:
generate an L3 packet comprising an Internet Protocol (IP) packet, which is fragmented into the at least one MAC PDU, from the at least one MAC PDU, and
generate at least one relay MAC PDU including the L3 packet generated from the at least one MAC PDU, without at least one header of the at least one MAC PDU, and
wherein the transceiver is further configured to transmit the at least one relay MAC PDU including the L3 packet using a RS Service Flow (SF) for a traffic, of a same Quality of Service (QoS) as QoS required by MS SFs carrying the L3 packet from the MS to the RS to the BS through the first connection.

11. The apparatus of claim 10,
wherein the transceiver receives at least one MAC PDU including a signaling message from the MS through the second connection,
wherein the processor generates a relay MAC PDU comprising the signaling message, and
wherein the transceiver transmits the relay MAC PDU comprising the signaling message to the BS using a RS SF dedicated to a signaling through the first connection.

12. The apparatus of claim 10,
wherein the transceiver receives at least one downlink relay MAC PDU from the BS through the first connection,
wherein the processor generates an L3 packet, which is fragmented into the at least one downlink relay MAC PDU, from the at least one relay MAC PDU, and generates at least one downlink MAC PDU including the L3 packet, and
wherein the transceiver transmits the at least one MAC PDU to the MS through the second connection.

13. The apparatus of claim 12, wherein the processor divides a payload of the at least one downlink relay MAC PDU into a plurality of L3 packets, and generates a plurality of downlink MAC PDUs for MS SFs corresponding to the L3 packets.

14. An apparatus of a gateway supporting a Layer-3 (L3) relay communication in a wireless communication system, the apparatus comprising:
a processor configured to establish an L3 connection with a Relay Station (RS); and
a communicator configured to receive, from a Base Station (BS), at least one Generic Routing Encapsulation (GRE) packet including traffic,
wherein the processor is further configured to:
determine that the at least one GRE packet is transmitted from the RS based on a header of the at least one GRE packet,
determine that the at least one GRE packet includes the traffic, if an RS Service Flow (SF) carrying a payload of the at least one GRE packet is dedicated to traffic, and
extract an L3 packet comprising an Internet Protocol (IP) packet of a Mobile Station (MS) from the at least one GRE packet, and
wherein the communicator transmits the L3 packet to a destination of the L3 packet.

15. The apparatus of claim 14,
wherein the communicator receives, from the BS, at least one GRE packet including a signaling message, and
wherein the processor determines that the at least one GRE packet is transmitted from the RS based on a header of the at least one GRE packet, determines that the at least one GRE packet includes the signaling message, if an RS SF carrying a payload of the at least one GRE packet is dedicated to signaling, and performs an operation corresponding to the signaling message.

16. The apparatus of claim 14,
wherein the communicator receives an L3 packet destined for the MS accessing the RS,
wherein the processor generates at least one packet for a RS SF including the L3 packet, and generates at least one GRE packet including the at least one packet for a RS SF, and
wherein the communicator transmits the at least one GRE packet to the BS.

17. The apparatus of claim 14,
wherein the communicator receives a plurality of L3 packets,
wherein the processor identifies RS SFs corresponding to MS SFs to carry the plurality of the L3 packets, and generates a single GRE packet including the plurality of the L3 packets corresponding to the same RS SF, and
wherein the communicator transmits the single GRE packet to the BS.

18. The apparatus of claim 14,
wherein, if downlink signaling to the at least one MS accessing the RS is needed, the processor generates a packet for a RS SF dedicated to signaling forwarding, and
wherein the communicator transmits a GRE packet including the packet for the RS SF to the BS.

19. A communication system supporting a Layer-3 (L3) relay communication comprising:
a Mobile Station (MS) configured to transmit at least one media Access Control (MAC) Protocol Data Unit (PDU) including traffic data or a signaling message to a Relay Station (RS);
the RS configured to:
receive the at least one MAC PDU from the MS,
generate at least one relay MAC PDU by removing at least one MAC header from the at least one MAC PDU, extracting at least one L3 packet from the at least one MAC PDU, and adding at least one relay MAC header to the at least one L3 packet, and
transmit the at least one relay MAC PDU using a RS Service Flow (SF) having a same Quality of Service (QoS) as QoS required by an MS SF carrying the at least one MAC PDU from the MS to the RS to a Base Station (BS);
the BS configured to:
receive the at least one relay MAC PDU from the RS,
generate at least one capsulation packet including the at least one relay MAC PDU, and
transmit the at least one capsulation packet to a gateway; and the gateway configured to:
receive the at least one capsulation packet from the BS, and
extract the at least one L3 packet of the MS from the at least one relay MAC PDU included in the at least one capsulation packet,
wherein the at least one relay MAC PDU is generated without at least one header of the at least one MAC PDU from the MS.

20. The communication system of claim 19,
wherein the MS establishes a first connection with the RS by performing a network entry procedure, and
wherein the RS establishes a second connection with the BS by performing another network entry procedure.

21. The communication system of claim 19, wherein if the at least MAC PDU includes the signaling message, the RS transmits the at least one relay MAC PDU using a RS SF dedicated to a signaling.

* * * * *